Aug. 25, 1936. M. WOOLVERTON 2,052,510
CULINARY UTENSIL
Filed May 2, 1935
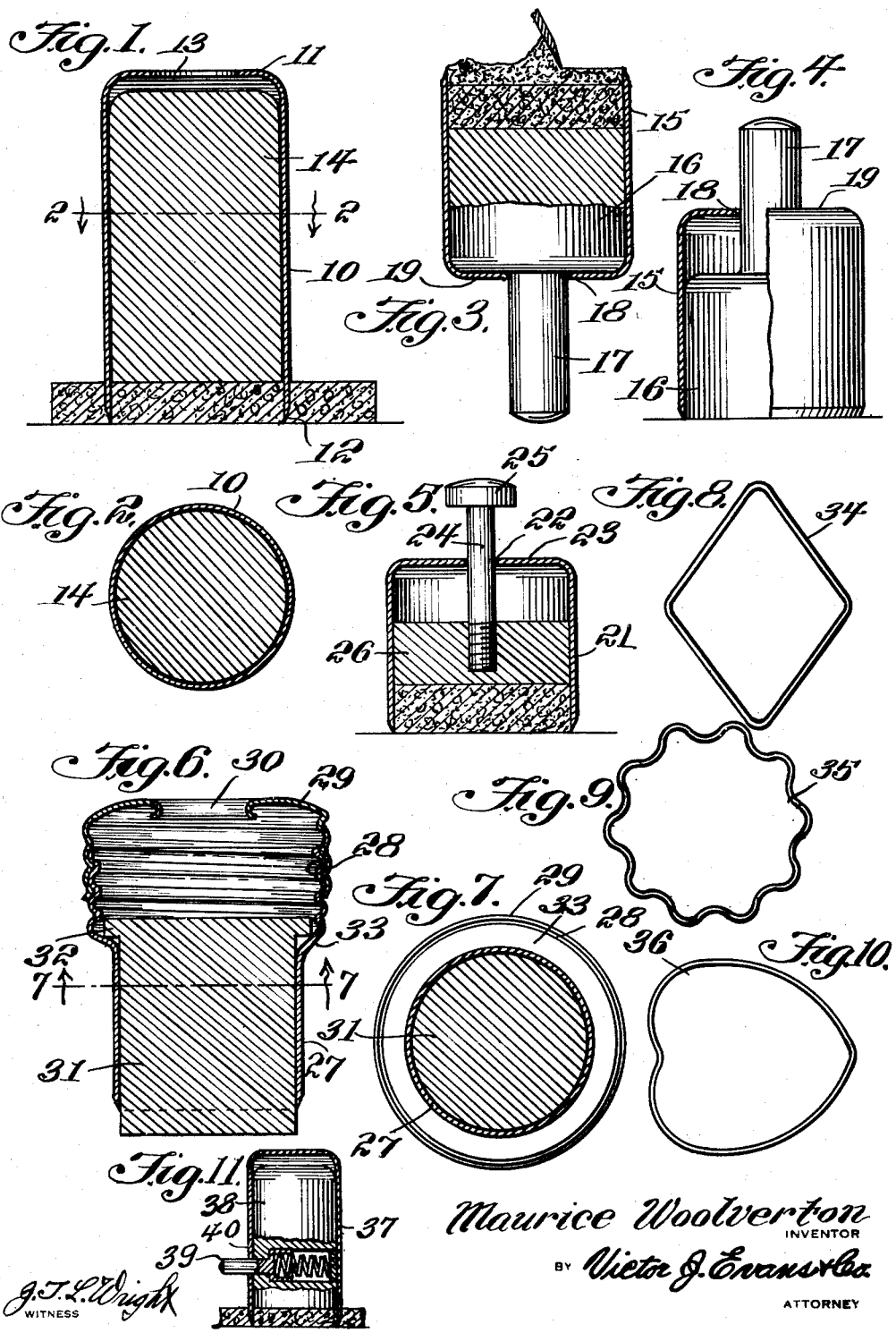
Maurice Woolverton
INVENTOR Patented Aug. 25, 1936

2,052,510

UNITED STATES PATENT OFFICE 2,052,510

CULINARY UTENSIL

Maurice Woolverton, Pittsfield, Mass., assignor of one-half to Maurice A. Chambers, Pittsfield, Mass.

Application May 2, 1935, Serial No. 19,504

2 Claims. (Cl. 107—1)

The invention relates to a culinary utensil and more especially to a device for the making of neat and uniform canapes, sandwiches, pastries or similar delicacies.

The primary object of the invention is the provision of a device of this character, wherein the canapes, sandwiches or similar delicacies can be formed by a cutting operation with dispatch and without the waste of materials, and a spread of paste applied without the usual messy condition resulting.

Another object of the invention is the provision of a device of this character, wherein a slice of bread or toast can be easily and readily cut and held in a position for a spread such as sandwich paste or canape paste, the excess of spread being readily removed and the finished product ejected with the result that a neat appetizing delicacy is easily and quickly made.

Another object of the invention is the provision of a device of this character whereby pastries such as biscuits or cookies can be easily cut and the dough readily ejected without sticking.

A further object of the invention is the provision of a device of this character, which is simple in construction, reliable and efficient in operation, sanitary, easy to use, and inexpensive to manufacture.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a vertical sectional view through the device constructed in accordance with the invention.

Figure 2 is a sectional view on the line 2—2 of Figure 1 looking in the direction of the arrows.

Figure 3 is a view similar to Figure 1 showing a modification.

Figure 4 is a side elevation partly in section.

Figure 5 is a view similar to Figure 1 showing a further modification.

Figure 6 is a view similar to Figure 1 showing a still further modification.

Figure 7 is a sectional view on the line 7—7 of Figure 1 looking in the direction of the arrows.

Figure 8 is a plan view of a cutting edge pattern.

Figure 9 is a plan view of another cutting edge pattern.

Figure 10 is a plan view of a further cutting edge pattern for the device.

Figure 11 is a view similar to Figure 1 showing another modification of the device.

Similar reference characters indicate corresponding parts throughout the several views in the drawing.

Referring to the drawing in detail, the device or utensil comprises a cylindrical body 10 preferably made from metal and open at one end while the other end is crowned as at 11, the open end being formed with a cutting edge 12. The crown 11 has an opening 13 therein for access to a plunger 14 which is slidably fitted within the body 10 and of less length than the latter.

In Figures 3 and 4 of the drawing there is shown a modified form of the device, wherein the cylindrical body 15 houses a plunger 16 having a reduced stem or shank 17 which passes through the opening 18 in the crown 19.

In Figure 5 of the drawing there is shown a further modification, wherein the body 21 has passing through the opening 22 in its crown 23 the plunger stem 24 formed with an outer hand knob 25, the stem 24 being threaded into the plunger 26 within the body 21.

In Figure 6 of the drawing there is shown a still further modification, wherein the cylindrical body 27 has formed therewith at its crowned end an enlarged threaded annular flange portion 28 for engagement by a separable screw crown 29, this having the opening 30 for access to the plunger 31 fitted within the body 27. The plunger 31 at its inner end is formed with a lateral annular shoulder 32 which limits the outward movement of the plunger by engaging the shoulder 33 formed in the body 27.

In Figure 8 of the drawing the cutting edge of the body is of substantially diamond shape as at 34 while in Figure 9 the cutting edge has the fluted formation or pattern 35 and in Figure 10 the cutting edge is of heart shape as at 36.

In the use of the device to make a neat uniform canape, sandwich or other delicacy it is necessary to lay a slice of bread or toast on a flat surface such as a bread board and by pressing the body 10 or the other forms of bodies of the device against this slice a piece of the slice will be cut by the cutting edge of the body and will become counterseated within the body whereupon on turning the body upside down there can be spread the canape or sandwich paste on to the bread, packing it to the desired depth with the knife and scraping off the excess paste around the edge. Then by manipulating the plunger the product in its finished condition can be ejected from the body with the result that an appetizing delicacy has been easily and quickly made.

When the plunger is devoid of a stem the finger of the hand of a user of the device can be projected through the opening in the crown so as to force the plunger outwardly in the direction of the open end of the body for extracting the edible as formed in this body.

In Figure 11 of the drawing there is shown a further modification, wherein the body 37 is devoid of an opening in its crown or closed end while the plunger 38 working within the body carries a spring projected pin 39 adapted for play in an elongated slot 40 provided in the body 37 and this projected pin operates within said slot to move the plunger 38 up and down and also to securely retain the said plunger within the body yet permitting it to be readily removed for cleaning and replacing purposes. In other words, the pin is a handle for actuating the plunger in the use of the device.

In the preferred and modified forms of construction the cylindrical body is made from tubular shaped metal. It is understood, of course, that changes, variations and modifications may be made in the structure as fall properly within the scope of the appended claims without departing from the spirit of the invention or sacrificing any of its advantages.

What is claimed is:

1. A utensil of the character described comprising a substantially cylindrical body having a cutting edge, an outstanding shoulder and an annular threaded flange extending from said shoulder, a crown, comprising a flanged cap which is threaded and which is adjustably screwed on the flange of the body, and which cap has its top provided with a central opening, and a plunger movable through the body, having an outstanding shoulder on its inner end to normally rest on the shoulder of the body and which plunger is limited in its movement into the body by the adjustment of the crown on said body.

2. A utensil of the character described comprising a tubular body open at opposite ends one of which is beveled to provide an annular cutting edge, a plunger slidably mounted in the body and formed at one end with a laterally projecting peripheral shoulder, and a detachable crown closing the body at the end remote from the cutting edge, the crown having an opening in its top leaving an inwardly projecting continuous flange spaced from the crown-engaged end of the body, the plunger having axial movement in the body limited by engagement of its one end with said continuous flange and its peripheral shoulder with a shoulder on the body, the plunger projecting from the body in one of its extreme positions and being wholly enclosed by the body and crown and spaced from said cutting edge in its other extreme position.

MAURICE WOOLVERTON.